(12) United States Patent
Shigeo et al.

(10) Patent No.: US 6,702,889 B2
(45) Date of Patent: Mar. 9, 2004

(54) PIGMENT DISPERSING LIQUID, INK COMPOSITION FOR INK JET AND METHOD FOR FORMING IMAGES

(75) Inventors: Hatada Shigeo, Numazu (JP); Taniguchi Keishi, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/082,080

(22) Filed: Feb. 26, 2002

(65) Prior Publication Data
US 2003/0024439 A1 Feb. 6, 2003

(30) Foreign Application Priority Data
Feb. 27, 2001 (JP) .......................... 2001-052720

(51) Int. Cl.$^7$ ............ C08K 5/00; C09D 11/00
(52) U.S. Cl. ............ 106/493; 106/31.86; 106/503; 523/160; 523/161; 524/553; 524/554; 524/585
(58) Field of Search ............ 106/493, 503, 106/31.86; 523/160, 161; 524/553, 554, 585; 347/100

(56) References Cited

U.S. PATENT DOCUMENTS

| | | | |
|---|---|---|---|
| 5,837,043 A | * 11/1998 | Wong et al. | 106/31.58 |
| 6,051,628 A | * 4/2000 | Bishop et al. | 523/160 |
| 6,231,652 B1 | * 5/2001 | Koyano et al. | 106/31.27 |
| 2001/0029273 A1 | * 10/2001 | Taniguchi et al. | 523/161 |

FOREIGN PATENT DOCUMENTS

EP 0924272 A1 * 6/1999
JP 10-95946 * 4/1998
JP 100095946 A * 4/1998

* cited by examiner

*Primary Examiner*—Anthony J. Green
(74) *Attorney, Agent, or Firm*—Oblon, Spivak, McClelland, Maier & Neustadt, P.C.

(57) ABSTRACT

A pigment dispersing liquid and an ink composition for ink jet that is made from a pigment dispersing liquid is described. The pigment dispersing liquid comprises at least a pigment, a dispersing agent and water, wherein the dispersing agent includes at least one compound selected from the compounds with formula (1a) or (1b):

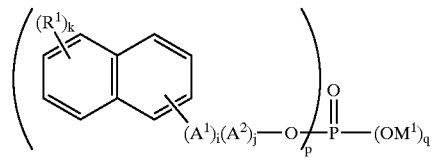

(1a)

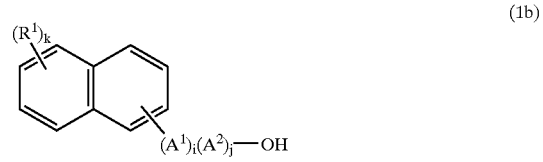

(1b)

The ink for ink jet is formulated with the pigment dispersing liquid and at least one additive selected from the group consisting of water, a water-soluble organic solvent, a surfactant and a preservative.

17 Claims, No Drawings

PIGMENT DISPERSING LIQUID, INK COMPOSITION FOR INK JET AND METHOD FOR FORMING IMAGES

CROSS-REFERENCE TO RELATED APPLICATION

This application claims the priority benefit of Japanese application serial no. 2001-052720, filed Feb. 27, 2001.

BACKGROUND OF THE INVENTION

1. Field of Invention

The present invention relates to a pigment dispersing liquid having improved discharge stability, liquid-phase stability and stability in pigment grain size and being capable of improving light stability and color visibility of printed images, an ink composition for ink jet using the pigment dispersing liquid, and a method for forming images with the ink composition.

2. Description of Related Art

The ink jet printing method has many advantages over other printing methods because it is simpler in process and can be configured easily for full-color printing, and allows the use of a simple apparatus to obtain a high resolution picture. The ink compositions for ink jet include dye-system ink compositions, which are usually fabricated by dissolving various water-soluble dyes in water or in a mixture of water and a water-soluble organic solvent, as described in the official gazettes of Japanese Patent Applications Laid Open No. Sho 63-51485, Sho 63-56575 and Hei 1-198671. The dye-system ink has improved color visibility but has poor light stability and poor water resistance for printed matters.

On the other hand, the pigment-system ink with carbon black or various organic pigments dispersed therein is widely studied now since it has higher light stability and better water resistance over the dye-system ink, as described in the official gazettes of Japanese Patent Applications Laid Open No. Sho 57-10660, Sho 57-10661, Hei 2-255875 and Hei 2-276876, and in Japanese Patent Publication No. Hei 1-15542. The causes of high light stability and high water resistance of the pigment-system ink are explained as follows.

When a pigment-system ink composition dries on a printed material, the pigment left as a coloring agent does not dissolve in water like a dye does and therefore will not effuse.

On other hand, since the light reactivity of a pigment is lower than that of a dye, the light stability of a pigment is higher than that of a dye.

The pigment-system ink is prepared by dispersing a mixture consisting of a pigment, a liquid medium and dispersing agents with a dispersing apparatus, such as a ball mill or a sand mill. However, the pigment-system ink easily causes a nozzle jam and to its detriment provides a narrower color gamut as compared with the dye-system ink. In order to prevent a nozzle jam and to broaden the color gamut, the pigment grains in the pigment dispersing liquid, used as a component of the ink for ink jet recording, usually have a size smaller than 200 nm, preferably smaller than 150 nm. This also ensures the visibility of the images printed with the ink and the secondary color reproducibility and the transparency of the ink. Therefore, it is necessary to atomize the pigment grains in the pigment dispersing liquid and to promote the long-time stability in mean grain size. The atomization of the pigment grains needs to be finished in a short period in order to reduce the price for industrial production.

Moreover, it is required that the pigment grain size in the pigment dispersing liquid be maintained even after a long period and/or under a high temperature or a low temperature, so as to prevent a nozzle jam of the printer.

Moreover, in order to atomize the pigment particles in a short period and to reduce the variation of the pigment grain size after a long period, the pigment dispersing agent is preferably used together with some additives.

Nevertheless, the ink compositions for ink jet currently used have the drawbacks of larger mean grain size, low stability in mean grain size and low discharge stability. Such ink compositions include those using styrene-acryl copolymer, styrene-maleic acid copolymer (Japanese Patent Applications Laid Open No. Sho 56-147863) and sodium naphthalenesulfonate/formalin condensate (Japanese Patent Applications Laid Open No. Sho 61-083267) as polymer pigment dispersing agents, and using polyethylene glycol alkylphenyl ether (Japanese Patent Applications Laid Open No. Hei 5-105837), polyethylene glycol alkylphenyl ether sulfate (Japanese Patent Applications Laid Open No. Hei 10-168367) and polyethylene glycol alkylphenyl ether phosphate (Japanese Patent Applications Laid Open No. Hei 10-88050) as surfactants.

SUMMARY OF THE INVENTION

In view of the above-mentioned problems, this invention provides a pigment dispersing liquid and an ink composition for ink jet that has a small mean pigment grain size, high stability in mean grain size and high discharge stability. Meanwhile, the pigment grains can be atomized in a short period during the preparation of the pigment dispersing liquid and the size variation over a long time of the pigment grains in the pigment dispersing liquid or in the ink can be reduced.

After studying the above-mentioned problems, the inventor provides an ink composition that contains a dispersing agent expressed by formula (1a) or (1b) below and preferably further contains specific additives including at least one of the compounds expressed by formulae (2), (3) and (4), respectively.

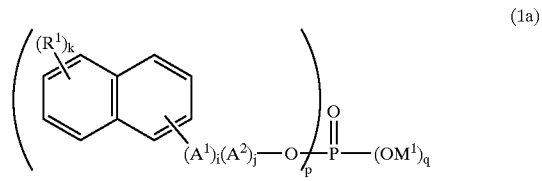

(1a)

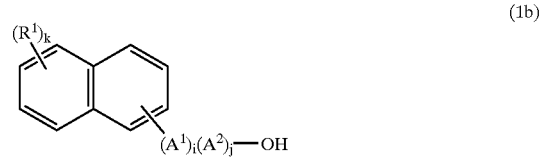

(1b)

wherein
  $R^1$ is H, a $C_1$–$C_{20}$ alkyl, allyl or aralkyl group, phenyl, substituted phenyl or naphthyl;
  k is an integer of 0–7;
  $A^1$ is oxyethylene, oxypropylene or a blend of oxyethylene and oxypropylene;
  $A^2$ is oxyethylene, oxypropylene or a blend of oxyethylene and oxypropylene;
  i, j $\geq$ 0 and (i+j) range from 30 to 100;
  $M^1$ is selected from the group consisting of H, Li, Na, K and $N^+R^2 R^3 R^4 R^5$, wherein each of $R^2$, $R^3$, $R^4$, and $R^5$ is either H, methyl, ethyl, 2-hydroxyethyl or 3-hydroxypropyl;

p, q≧1 and (p+q)=3.

The group $R^1$ with a carbon number exceeding 20 will lower the dispersion stability and increase the viscosity of the colorant dispersing liquid. The value of (i+j) preferably ranges from 30 to 100, more preferably from 30 to 80. When (i+j) is larger than 100, the viscosity of the dispersing liquid or the ink increases and the stability in mean grain size becomes lower. In addition, p and q can be set as a combination of p=1 and q=2, or as another combination of p=2 and q=1.

The formulae (2), (3) and (4) are as follows.

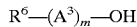  (2)

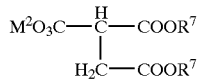  (3)

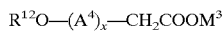  (4)

wherein

In formula (2), $R^6$ is $C_8$–$C_{14}$ alkyl, $A^3$ is oxyethylene, oxypropylene, or a blend of oxyethylene and oxypropylene, and m is an integer of 3–16;

In formula (3), $M^2$ is selected from the group consisting of H, Li, Na, K and $N^+R^8 R^9 R^{10} R^{11}$, wherein each of $R^8$, $R^9$, $R^{10}$, and $R^{11}$ is either H, methyl, ethyl, 2-hydroxyethyl, or 3-hydroxypropyl, and $R^7$ is $C_1$–$C_{20}$ alkyl; and In formula (4), $R^{12}$ is $C_1$–$C_{20}$ alkyl; $A^4$ is oxyethylene, oxypropylene, or a blend of oxyethylene and oxypropylene; x is an integer of 1–12; and $M^3$ is selected from the group consisting of H, Li, Na, K and $N^+R^{13} R^{14} R^{16}$, wherein each of $R^{13}$, $R^{14}$, $R^{15}$, and $R^{16}$ is either H, methyl, ethyl, 2-hydroxyethyl or 3-hydroxypropyl.

The group $R^6$ in the compound of formula (2) is preferably an alkyl group having from 8 to 14 carbon atoms. When the carbon number is less than 8 or larger than 14, the stability in mean grain size is lowered. In addition, m is preferably an integer ranging from 3 to 16. When m is less than 3 or larger than 16, the stabilizing effect for the grain size becomes weaker. The group $R^7$ in the compound of formula (3) is preferably an alkyl group having from 1 to 20 carbon atoms. When $R^7$ is H or its carbon number exceeds 20, the stability in the mean grain size is lowered. Moreover, when the group $R^{12}$ in the compound of formula (4) is H or its carbon number exceeds 20, the stabilizing effect for the colorant grain size in the colorant dispersing liquid becomes weaker. In addition, $A^4$ is suitably oxyethylene, oxypropylene or a blend of oxyethylene and oxypropylene, and x is preferably an integer from 1 to 12. When x is equal to 0 or is larger than 12, the stability in the mean grain size is lowered.

This invention also provides a pigment dispersing liquid, which comprises at least a pigment, a dispersing agent and water, wherein the dispersing agent includes at least one compound with a general formula (1a) or (1b).

The pigment in the pigment dispersing liquid may comprise Pigment Yellow 138 and or Pigment Red 122. Besides, the pigment may comprise at least one pigment selected from the group consisting of Pigment Blue 15, Pigment Blue 15:1, Pigment Blue 15:2, Pigment Blue 15:3 and Pigment Blue 15:4. In addition, the pigment may comprise carbon black.

Moreover, in the pigment dispersing liquid of this invention, the ratio of the dispersing agent to the pigment ranges from 1/15 to 1 and the mean grain size of the pigment ranges from 20 nm to 200 nm. In addition, the concentration of the pigment ranges from 5 wt % to 30 wt %.

This invention further provides an ink composition for ink jet, which comprises the above-mentioned pigment dispersing liquid and at least one additive selected from the group consisting of water, a water-soluble solvent, a surfactant and a preservative. In the ink composition, the mean grain size of the pigment ranges from 20 nm to 200 nm and the concentration of the pigment ranges from 1 wt % to 8 wt %.

This invention also provides a method for forming images, which comprises using the above-mentioned ink composition to print images with a piezo-type ink jet printer or a thermal-type ink jet printer.

Some preferred embodiments of this invention will be described hereinafter. However, it is to be understood that both the foregoing general description and the following detailed description of the preferred embodiments of this invention are exemplary, and are intended to provide further explanation of the invention as claimed.

DESCRIPTION OF THE PREFERRED EMBODIMENTS

Composition of Colorant Dispersing Liquid/Ink

In the preferred embodiments of this invention, the colorant dispersing liquid contains a colorant and a dispersing agent, which includes at least one compound with a general formula (1a) or (1b) mentioned above. The colorant dispersing liquid is suitably used in an ink composition for ink jet. The colorant dispersing liquid preferably further contains at least one additive selected from the groups consisting of the above-mentioned compounds expressed by formula (2), (3) and (4), respectively. By using the colorant dispersing agent of this invention, the colorant dispersing liquids of this invention can have small mean grain size and high stability in mean colorant grain size. Therefore, the ink compositions made from the colorant dispersing liquids of this invention have small mean grain size and high discharge stability.

In the colorant dispersing liquid, the weight ratio of the compound of formula (1a) or (1b) to the compound of formula (2) preferably ranges from 99.99/0.01 to 60/40. When the ratio exceeds 99.99/0.01, the effect of adding the compound of formula (2) is barely seen and the stabilizing effect for the colorant grain size in the colorant dispersing liquid is little improved. When the ratio is less than 60/40, the stabilizing effect for the colorant grain size is also little improved.

Moreover, in the colorant dispersing liquid, the weight ratio of the compound of formula (1a) or (1b) to the compound of formula (3) or formula (4) also preferably ranges from 99.99/0.01 to 60/40 for the same reasons mentioned above.

The colorants used in the colorant dispersing liquid have no specific restriction, but the preferred examples of the colorants are listed below.

As a black colorant, the colorant includes carbon black species, such as furnace black, lamp black, acetylene black and channel black; metal species, such as copper, iron and titanium oxide; and organic colorants, such as o-nitroaniline.

As a yellow colorant, the colorant includes Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155 and Pigment Yellow 180, for example.

As a magenta colorant, the colorant includes Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202 and Pigment Violet 19, for example.

As a cyan colorant, the colorant includes Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Bat Blue 4 and Bat Blue 60, for example. Particularly, carbon black, Pigment Yellow 138, Pigment Red 122, and Pigment Blue 15 (or 15:3) are preferably used as the black colorant, the yellow colorant, the magenta colorant, and the cyan colorant, respectively, in order to obtain an ink composition having better color tone, higher light stability, higher dispersing stability and color tone reproducibility and capability of attaining a color balance. Particularly, Pigment Red 122 can be treated on the surface with colorant derivatives to acquire better dispersing stability and is therefore preferably used.

Other colorants include toluidine red, permanent carmine FB, first yellow AAA, disazo orange PMP, lake red C, brilliant carmine 6B, phthalocyanine blue, quinacridon red, dioxane violet, Victoria Pure Blue, alkali blue toner, first yellow 10G, disazo yellow AAMX, disazo yellow AAOT, disazo yellow AAOA, yellow ferric oxide, disazo yellow HR, o-nitroaniline orange, dinitroaniline orange, Balkan Orange, toluidine red, chlorinated paranitraniline red, Brilliant First Scarlet Red, naphthol red 23, pyrazolone red, barium red 2B, barium-lithium red, Pigment Scarlet Red 3B lake, Lake Bordeaux 10B, anthosine 3B lake, anthosine 5B lake, rhodamine 6G lake, eosin lake, Indian Red, Fanatol Red FGR, rhodamine B lake, methylviolet lake, dioxazine violet, basic blue 5B lake, basic blue 6G lake, first scaw blue, alkali blue R toner, peacock blue lake, Prussian Blue, ultramarine blue, reflex blue 2G, reflex blue R, brilliant green lake, diamond green thioflavin lake, phthalocyanine green G, green gold, phthalocyanine green Y, ferric oxide powder, rust, zinc white, titanium oxide, calcium carbonate, clay, barium sulfate, alumina, alumina white, aluminium powder, bronze powder, daylight fluorescent color, pearl color, naphthol carmine FB, naphthol red M, permanent carmine FB, first yellow G, disazo yellow AAA, dioxane violet and alkali blue G toner. Still other colorants include processed colorants like grafting carbon, of which the surface is treated with a material such as a resin. In such situations, it is possible to mix more than two colorants.

In the pigment dispersing liquid of the preferred embodiments, the ratio of the dispersing agent to the pigment preferably ranges from 1/15 to 1. If the ratio is less than 1/15, the storage stability of the dispersing liquid and the ink is poor, which easily causes a jam of the nozzle. If the ratio exceeds 1, the viscosity of the dispersing liquid or the ink is high and using the ink for ink jet is therefore difficult.

The mean colorant grain size in the dispersing liquid or in the ink preferably ranges from 20 nm to 200 nm. If the mean grain size exceeds 200 nm, a nozzle jam easily occurs and the color visibility is poor. If the mean size is less than 20 nm, the colorant dispersion process is difficult, the cost is high and the storage stability and the light stability are poor. The mean grain size is measured by using Microtrack UPA manufactured by Nikkiso Co., Ltd.

Moreover, the colorant concentration in the dispersing liquid preferably ranges from 5 wt % to 30 wt %. If the colorant concentration is less than 5 wt %, much dispersing liquid is needed to formulate the ink with a required colorant concentration and the productivity is therefore lowered. If the colorant concentration exceeds 30 wt %, the viscosity of the dispersing liquid is high and the colorant dispersion process becomes difficult.

Except for water, the additives in the dispersing liquid includes water-soluble organic media, various non-ion, anion, cation or amphoteric surfactants and preservatives, for example. The water-soluble organic media includes, for example, $C_1$–$C_4$ alcohols, amide compounds and ether. The $C_1$–$C_4$ alcohol includes methanol, ethanol, 1-propanol, 2-propanol, 1-butanol, 2-butanol and isobutyl alcohol. The amide compounds include dimethylformamide and dimethyl-acetamide. The ether includes tetrahydrofuran and dioxane.

Moreover, Polyalkylene glycols, alkylene glycols having from 2 to 6 carbon atoms and triols can also be used as the water-soluble organic media. Specific examples of such polyalkylene glycols include polyethylene glycol and polypropylene glycol. Specific examples of the alkylene glycols having from 2 to 6 carbon atoms include ethylene glycol, diethylene glycol, triethylene glycol, propylene glycol, 1,2-propandiol, 1,2-butandiol, 1,3-butandiol, 1,4-butandiol, thiodiglycol and hexyleneglycol. Specific examples of the triols include glycerol and 1,2,6-hexantriol.

The water-soluble organic media further includes ether compounds consisting of a polyol and a lower alkyl group, pyrrolidone derivatives, ketone compounds and alkanolamine. The ether compounds includes ethylene glycol monomethyl (or ethyl) ether, diethylene glycol methyl (or ethyl) ether, triethylene glycol monomethyl (or ethyl) and monoether/diether derivatives produced from the condensation reactions of the polyol and the alcohol mentioned above. The pyrrolidone derivatives include N-methylpyrrolidone and 2-pyrrolidone. The ketone compounds include acetone and methylethylketone. The alkanolamine includes monoethanolamine, diethanolamine and triethanolamine. Besides, the water-soluble organic media can be 1,3-dimethyl-2-imidazolidinone.

Among the water-soluble organic media mentioned above, the poly alcohol (e.g., diethylene glycol) and the ether consisting of a polyol and a lower alkyl group (e.g., triethylene glycol mono-methyl (or ethyl) ether) are preferably used.

Furthermore, the colorant concentration in the ink preferably ranges from 1 wt % to 8 wt %. When the colorant concentration is less than 1 wt %, the visibility of the printed material is poor since the picture concentration is low. If the colorant concentration exceeds 8 wt %, the viscosity of the ink is high and a nozzle jam easily occurs. In addition, the additives in the ink are those used in the dispersing liquid, for example. Moreover, the amount of the water-soluble organic solvent in the ink preferably ranges from 0 to 50 wt %.

Fabrication and Use of Colorant Dispersing Liquid/Ink

To fabricate the colorant dispersing liquid, a colorant, a dispersing agent and a mixture of water and a water-soluble organic solvent are mixed by using a well-known dispersing apparatus, such as a sand mill, a ball mill, a dinomill, a roll mill, a nanomizer or a homogenizer, etc. Moreover, the ink is fabricated by stirring and mixing the colorant dispersing liquid, water, a water-soluble organic solvent and a surfactant, followed by removing large grains in the mixture with a filter or a centrifugal separation apparatus, and then degassing the mixture.

The compounds of formulae (2), (3) and (4) that serve as the additives of the ink composition can be added together with the dispersing agent during the dispersing process of the colorant. However, it is also feasible to add them into the composition during formulation of the ink composition with the colorant dispersing liquid.

The group $R^6$ in the compound of formula (2) is preferably an alkyl group having from 8 to 14 carbon atoms. When the carbon number is less than 8 or larger than 14, the stability in mean grain size is lowered. In addition, m is preferably an integer of 3–16. When m is less than 3 or larger than 16, the stabilizing effect for the grain size become weaker.

The group $R^7$ in the compound of formula (3) is preferably an alkyl group having from 1 to 20 carbon atoms. When $R^7$ is H or its carbon number exceeds 20, the stability in the mean grain size is lowered.

Moreover, when the group $R^{12}$ in the compound of formula (4) is H or its carbon number exceeds 20, the stabilizing effect for the colorant grain size in the colorant dispersing liquid becomes weaker. In addition, $A^4$ is suitably oxyethylene, oxypropylene or a blend of oxyethylene and oxypropylene, and x is preferably an integer from 1 to 12. When x is equal to 0 or is larger than 12, the stability in the mean grain size is lowered.

The printing method using the ink includes continuous jet-type printing and on-demand-type printing, for example. The on-demand-type printing method includes piezo method, thermal ink jet method, bubble jet method, and electrostatic method, for example.

The following embodiments and examples are provided to further demonstrate the effects of this invention in detail, but not to restrict the scope of this invention. In the examples, the amounts of the components are all expressed by parts in weight.

First Embodiment

For the examples in the first embodiment of this invention, the colorant dispersing agent is the compound of formula (1a) mentioned above.

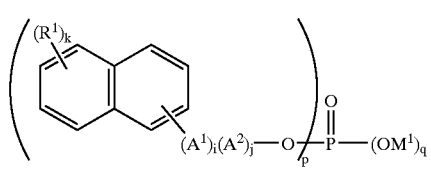
(1a)

EXAMPLE 1

In this case, a colorant dispersing liquid (A) is prepared using the formula 1, of which the components are listed below.

| Formula 1 | |
|---|---|
| Pigment Red 122 | 30 parts |
| (Toner Magenta E02 produced by Clariant International Ltd.) | |
| Compound of formula (1a) | 15 parts |
| ($k = 0$, $i = 40$, $j = 0$, $A^1$ = oxyethylene, $M^1$ = K, $p = 1$ and $q = 2$) heptaethylene glycol mono (5-tridecyl) ether | |
| [Compound of formula (2) with $R^6$ being a $C_{10}$ branched alkyl group, $A^3$ being oxyethylene, and m = 7] | 0.2 part |
| distilled water | 155 parts |

All of the components are premixed and then loaded into a vessel of 1 liter. Subsequently, zirconia beads with a diameter of 0.3 mm are loaded into the vessel with an amount of 900 g. A batch-type desktop sand mill manufactured by Kanpe Hapio Corporation is used to disperse the mixture for 48 hours to obtain the colorant dispersing liquid (A).

EXAMPLE 2

A colorant dispersing liquid (B) is obtained in this example with the same method as described in Example 1 except that the formula 2 described below is used to replace the formula 1.

| Formula 2 | |
|---|---|
| Pigment Blue 15:3 | 30 parts |
| (LIONOL BLUE FG-7351 by TOYO INK MFG. CO., LTD.) | |
| Compound of formula (1) ($R^1$ = CH(CH$_3$)$_2$, $k = 1$, $i = 80$, $j = 0$, $A^1$ = oxyethylene, $M^1$ = NH$_4$, $p = 1$, $q = 2$) | 15 parts |
| sodium dioctylsulfosuccinate (Compound of formula (3) with $M^2$ = Na and $R^7$ = a $C_8$ branched alkyl group) | 0.2 part |
| distilled water | 155 parts |

EXAMPLE 3

A colorant dispersing liquid (C) is obtained in this example with the same method as described in Example 1 except that the formula 3 described below is used to replace the formula 1.

| Formula 3 | |
|---|---|
| Pigment Yellow 138 | 30 parts |
| (LIONOGEN YELLOW 1010 by TOYO INK MFG. CO., LTD.) | |
| compound of formula (1) ($k = 0$, $i = 12$, $j = 48$, $A^1$ = oxypropylene, $A^2$ = oxyethylene, $M^1$ = Na, $p = 1$ and $q = 2$) | 15 parts |
| sodium polyoxyethylene (3) alkyl ($C_{13}$) ether acetate (Compound of formula (4) with $R^{12}$ being a $C_{13}$ normal alkyl group, $A^4$ being oxyethylene, $x = 3$ and $M^3$ being Na) | 0.2 part |
| distilled water | 155 parts |

EXAMPLE 4

A colorant dispersing liquid (D) is obtained in this example with the same method as described in Example 1 except that the formula 4 described below is used to replace the formula 1.

| Formula 4 | |
|---|---|
| Pigment Yellow 138 | 30 parts |
| (LIONOGEN YELLOW 1010 by TOYO INK MFG. CO., LTD.) | |
| Compound of formula (1) ($k = 0$, $i = 70$, $j = 0$, $A^1$ = oxyethylene, $M^1$ = K, $p = 1$, $q = 2$) | 15 parts |
| distilled water | 155 parts |

EXAMPLE 5

A colorant dispersing liquid (E) is obtained in this example with the same method as described in Example 1 except that Pigment Red 122 takes 15 parts and the distilled water takes 170 parts.

EXAMPLE 6

A colorant dispersing liquid (F) is obtained in this example with the same method as described in Example 1 except that Pigment Red 122 takes 50 parts, the compound of formula (1) takes 12 parts and the distilled water takes 138 parts.

Comparative Example 1

A colorant dispersing liquid (G) is obtained in this example with the same method as described in Example 1 except that the formula 5 described below is used to replace the formula 1.

Formula 5

| | |
|---|---|
| Pigment red 122 | 30 parts |
| (Toner Magenta E02 by Clariant International Ltd.) | |
| polyvinylpyrrolidone (mean molecular weight = 25000) | 15 parts |
| sodium polyoxyethylene (3) alkyl ($C_{13}$) ether acetate | 0.2 part |
| (Compound of formula (4) with $R^{12}$ being a $C_{13}$ normal alkyl group, $A^4$ being oxyethylene, x = 3 and $M^3$ being Na) | |
| distilled water | 155 parts |

Comparative Example 2

A colorant dispersing liquid (H) is obtained in this example with the same method as described in Example 1 except that the formula 6 described below is used to replace the formula 1.

Formula 6

| | |
|---|---|
| Pigment Red 122 | 30 parts |
| (Toner Magenta E02 by Clariant International Ltd.) | |
| polyoxyethylene alkyl ether phosphate ester | 15 parts |
| (PLYSURF A219B by Dai-ichi Kogyo Seiyaku Co., Ltd.) | |
| distilled water | 155 parts |

Comparative Example 3

A colorant dispersing liquid (I) is obtained in this example with the same method as described in Example 1 except that the formula 7 described below is used to replace the formula 1.

Formula 7

| | |
|---|---|
| Pigment red 122 | 30 parts |
| (Toner Magenta E02 by Clariant International Ltd.) | |
| Compound of formula (1) | 15 parts |
| (k = 0, i = 20, j = 0, $A^1$ = oxyethylene, $M^1$ = Na, p = 1, q = 2) | |
| Pionin A-51-B (by Takemoto Oil & Fat Co., Ltd.) | 0.2 part |
| distilled water | 155 parts |

Comparative Example 4

A colorant dispersing liquid (J) is obtained in this example with the same method as described in Example 1 except that the formula 8 described below is used to replace the formula 1.

Formula 8

| | |
|---|---|
| Pigment Red 122 | 30 parts |
| (Toner Magenta E02 by Clariant International Ltd.) | |
| Compound of formula (1) | 15 parts |
| (k = 0, i = 130, j = 0, $A^1$ = oxyethylene, $M^1$ = $NH_4$, p = 1, q = 2) | |
| Pionin A-51-B (by Takemoto Oil & Fat Co., Ltd.) | 0.2 part |
| distilled water | 155 parts |

The dispersing liquids (A)–(J) are then used to formulate ink compositions (a)–(j), respectively, with an ink formula 1 described below. The mixture is stirred for 30 min and then filtered with a membrane filter having a pore size of 0.8 μm and then degassed in vacuum. The samples that cannot be filtered are directly measured without filtration.

Ink Formula 1

| | |
|---|---|
| Colorant dispersing liquid | 40 parts |
| Glycerol | 7.50 parts |
| Diethyleneglycol | 22.50 parts |
| 2-pyrrolidone | 3.00 parts |
| sodium polyoxyethylene (3) alkyl ($C_{13}$) ether acetate | 0.45 part |
| distilled water | 76.55 parts |

The colorant dispersing liquid (A)–(J) and the ink compositions (a)–(j) are measured for their mean grain sizes. Being aged for seven days under 70° C., the ink compositions (a)–(j) are measured again for their mean grain sizes and are used for ink-jet printing with EPSON Ink Jet Printer MJ-930C (piezo-type) and HP Ink Jet Printer DeskJet 880C (thermal-type), whereby the discharge stability is evaluated. The results are listed in Table 1 and Table 2.

TABLE 1

| Colorant Dispersing Liquid | Mean Grain size (before aging, nm) | Mean Grain size (after aging, nm) |
|---|---|---|
| (A) | 140.6 | 146.1 |
| (B) | 109.2 | 111.3 |
| (C) | 90.9 | 89.7 |
| (D) | 124.8 | 129.6 |
| (E) | 115.6 | 117.3 |
| (F) | 145.3 | 149.7 |
| (G) | 220.5 | 270.3 |
| (H) | 223.1 | 245.4 |
| (I) | 210.6 | 230.2 |
| (J) | 270.7 | 265.3 |

TABLE 2

| Ink | Mean Grain size (before aging, nm) | Mean Grain size (after aging, nm) | Discharge Stability (MJ-930C) | Discharge Stability (DeskJet 880C) |
|---|---|---|---|---|
| (a) | 142.8 | 143.3 | O | O |
| (b) | 107.6 | 108.0 | O | O |
| (c) | 86.1 | 84.7 | O | O |
| (d) | 125.2 | 128.8 | O | O |
| (e) | 118.4 | 120.5 | O | O |
| (f) | 145.6 | 150.9 | O | O |
| (g) | 225.8 | 266.0 | X | X |
| (h) | 222.1 | 262.3 | X | X |
| (i) | 205.6 | 248.4 | X | X |
| (j) | 261.2 | 270.8 | X | X |

TABLE 2-continued

| Ink | Mean Grain size (before aging, nm) | Mean Grain size (after aging, nm) | Discharge Stability (MJ-930C) | Discharge Stability (DeskJet 880C) |
|---|---|---|---|---|

Discharge Stability:
O: no head jam
X: head jam occurs

As that shown in Table 1 & 2, the colorant dispersing liquids and the ink compositions made from the colorant dispersing liquids of this invention have small mean colorant grain sizes, higher stability in mean colorant grain size and higher discharge stability. Moreover, by using the ink compositions of this invention the color tone of the printout is good.

Second Embodiment

In this embodiment, the colorant dispersing agent is the compound of formula (1b') shown below, which is a specific form of the compound of formula (1b) with $A^1=A^2=$ oxyethylene and $(i+j)=n(30 \leqq n \leqq 100)$.

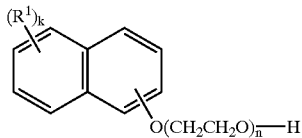
(1b')

The compound of formula (1b') includes:

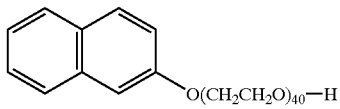
No.1

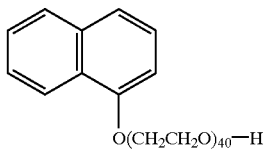
No.2

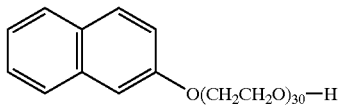
No.3

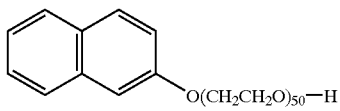
No.4

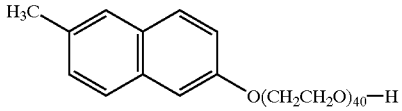
No.5

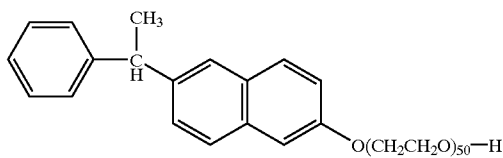
No.6

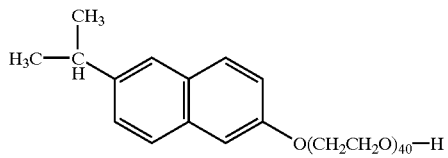
No.7

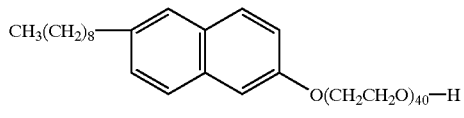
No.8

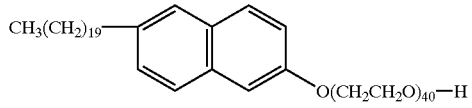
No.9

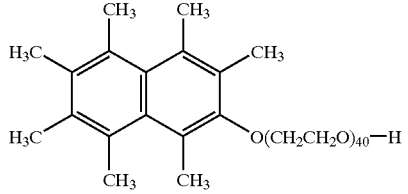
No.10

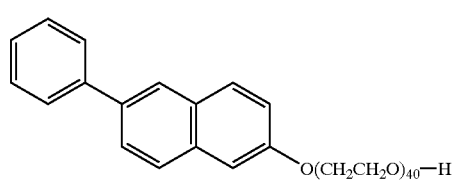
No.11

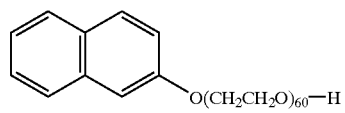
No.12

EXAMPLE 7

In this example, a colorant dispersing liquid (A) is prepared from a mixture (A), of which the components are listed below.

| Mixture (A) | |
|---|---|
| Pigment Red 122 (Toner Magenta E02 by Clariant International Ltd.) | 24 parts |
| 10 wt % aqueous solution of POE (n = 40) β-naphthol ether (dispersing agent of formula (lb')) | 120 parts |
| ion-exchanged water | 16 parts |

The mixture (A) is loaded into a beaker of 500 ml and then stirred for 3 hours with a Teflon-coated stirrer.

The mixture (A) having been stirred is loaded into a sand mill (batch-type desktop sand mill manufactured by Kanpe Hapio Corporation) and then lots of zirconia beads with a diameter of 0.3 mm are used to disperse the mixture (A) for 48 hours to obtain the colorant dispersing liquid (A) with a mean grain size of 120.5 nm (measured by using Microtrack UPA150 manufactured by Nikkiso Co., Ltd.)

The colorant dispersing liquid (A) obtained is then use to formulate an ink composition for ink jet with a formula (a) described below. After being stirred for 30 minutes, the mixture is filtered with a membrane filter having a pore size of 0.8 μm and then degassed in vacuum to obtain ink composition (a) for ink jet.

| Ink Formula (a) | |
| --- | --- |
| Colorant dispersing liquid (A) | 40 parts |
| Glycerol | 7.50 parts |
| Diethyleneglycol | 22.50 parts |
| 2-pyrrolidone | 3.00 parts |
| sodium polyoxyethylene (3) alkyl ($C_{13}$) ether acetate (Compound of formula (4) with $M_2$ being Na, $R^{12}$ being a $C_{13}$ normal alkyl group and x = 3) | 1.45 part |
| ion-exchanged water | 75.55 parts |

The ink composition (a) for ink jet is placed in an airtight polymer container and then aged for 1 week under 70° C. Thereafter, the mean grain size of the ink is measured to be 121.1 nm.

EXAMPLE 8

In this example, a colorant dispersing liquid (B) is prepared from a mixture (B), of which the components are listed below.

| Mixture (B) | |
| --- | --- |
| Pigment Red 122 (FASTOGEN SUPER MAGENTA RG by DAINIPPON INK AND CHEMICALS, INCORPORATED) | 24 parts |
| 10 wt % aqueous solution of POE (n = 40) β-naphthol ether (dispersing agent of formula (Ib') | 120 parts |
| heptaethylene glycol mono (5-decyl) ether (compound of formula (2) with $R^6$ being a $C_{10}$ normal alkyl group, $A^3$ being oxyethylene and n = 7) | 0.2 part |
| ion-exchanged water | 15.8 pats |

The mixture (B) is dispersed with the same method as described in Example 7, and the mean grain size is measured to be 118.7 nm. The colorant dispersing liquid (B) obtained is then use to formulate an ink composition for ink jet with an ink formula (b) described below. After being stirred for 30 minutes, the mixture is filtered with a membrane filter having a pore size of 0.8 μm and then degassed in vacuum to obtain an ink composition (b) for ink jet.

| Ink Formula (b) | |
| --- | --- |
| Colorant dispersing liquid (B) | 40 parts |
| Glycerol | 7.50 parts |
| Diethyleneglycol | 22.50 parts |
| 2-pyrrolidone | 3.00 parts |
| ion-exchanged water | 77 parts |

The ink composition (b) for ink jet is placed in an airtight polymer container and then aged for 1 week under 70° C. Thereafter, the mean grain size of the ink is measured to be 119.1 nm.

EXAMPLE 9

In this example, the colorant dispersing liquid (A) is use to formulate an ink composition for ink jet with an ink formula (c) described below. After being stirred for 30 minutes, the mixture is filtered with a membrane filter having a pore size of 0.8 μm and then degassed in vacuum to obtain an ink composition (c) for ink jet.

| Ink Formula (c) | |
| --- | --- |
| Colorant dispersing liquid (A) | 40 parts |
| Glycerol | 7.50 parts |
| Diethyleneglycol | 22.50 parts |
| 2-pyrrolidone | 3.00 parts |
| sodium dioctylsulfosuccinate (compound of formula (3) with $M^2$ being Na and $R^7$ being a $C_8$ normal alkyl group) | 0.5 part |
| ion-exchanged water | 75.55 parts |

The ink composition (c) for ink jet is placed in an airtight polymer container and then aged for 1 week under 70° C. Thereafter, the mean grain size of the ink composition (c) is measured to be 120.7 nm.

EXAMPLE 10

In this example, a colorant dispersing liquid (C) is prepared from a mixture (C), of which the components are listed below.

| Mixture (C) | |
| --- | --- |
| Pigment Yellow 138 (LIONOGEN YELLOW 1010 by TOYO INK MFG. CO., LTD.) | 24 parts |
| 10 wt % aqueous solution of POE (n = 40) α-naphthol ether (dispersing agent of formula No. 2) | 120 parts |
| ion-exchanged water | 16 parts |

The mixture (C) is dispersed with the same method as described in Example 7, and the mean grain size is measured to be 70.2 nm.

The colorant dispersing liquid (C) obtained is then used to formulate an ink composition for ink jet with the ink formula (d) described below. After being stirred for 30 minutes, the mixture is filtered with a membrane filter having a pore size of 0.8 μm and then degassed in vacuum to obtain an ink composition (d) for ink jet.

| Ink Formula (d) | |
| --- | --- |
| Colorant dispersing liquid (C) | 40.0 parts |
| Glycerol | 7.5 parts |
| Diethyleneglycol | 22.5 parts |
| 2-pyrrolidone | 3.0 parts |
| ion-exchanged water | 77.0 parts |

The ink composition (d) for ink jet is placed in an airtight polymer container and then aged for 1 week under 70° C. Thereafter, the mean grain size of the ink (d) is measured to be 71.6 nm.

EXAMPLE 11

In this example, the colorant dispersing liquid (A) is use to formulate an ink composition for ink jet with the ink formula (e) described below. After being stirred for 30 minutes, the mixture is filtered with a membrane filter having a pore size of 0.8 μm and then degassed in vacuum to obtain an ink composition (e) for ink jet.

| Ink Formula (e) | |
|---|---|
| Colorant dispersing liquid (A) | 40.0 parts |
| Glycerol | 7.5 parts |
| Diethyleneglycol | 22.5 parts |
| 2-pyrrolidone | 3.0 parts |
| ion-exchanged water | 77.0 parts |

The ink composition (e) for ink jet is placed in an airtight polymer container and then aged for 1 week under 70° C. Thereafter, the mean grain size of the ink (e) is measured to be 145.6 nm.

EXAMPLE 12

In this example, a colorant dispersing liquid (D) is prepared from a mixture (D), of which the components are listed below.

| Mixture (D) | |
|---|---|
| Pigment Blue 15:3 (LIONOL BLUE FG-7351 by TOYO INK MFG. CO., LTD.) | 24 parts |
| 10 wt % aqueous solution of POE (n = 40) β-naphthol ether (dispersing agent of formula No. 1) | 120 parts |
| ion-exchanged water | 16 parts |

The mixture (D) is dispersed with the same method as described in Example 7, and the mean grain size is measured to be 97.1 nm. The colorant dispersing liquid (D) obtained is then use to formulate an ink composition (f) for ink jet with the ink formula (f) described below. After being stirred for 30 minutes, the mixture is filtered with a membrane filter having a pore size of 0.8 μm and then degassed in vacuum to obtain the ink composition (f) for ink jet.

| Ink Formula (f) | |
|---|---|
| Colorant dispersing liquid (D) | 40.0 parts |
| Glycerol | 7.5 parts |
| Diethyleneglycol | 22.5 parts |
| 2-pyrrolidone | 3.0 parts |
| ion-exchanged water | 77.0 parts |

The ink composition (f) for ink jet is placed in an airtight polymer container and then aged for 1 week under 70° C. Thereafter, the mean particle size of the ink is measured to be 96.7 nm.

Comparative Example 5

In this example, a colorant dispersing liquid (E) is prepared from a mixture (E), of which the components are listed below.

| Mixture (E) | |
|---|---|
| Pigment Red 122 (Toner Magenta E02 by Clariant International Ltd.) | 24 parts |
| 10 wt % aqueous solution of styrene-acrylic acid copolymer (JONCRYL HDP71 aqueous solution by Johnson Polymer Co.) | 120 parts |
| ion-exchanged water | 16 parts |

The mixture (E) is dispersed with the same method as in Example 7, and the mean grain size is measured to be 210.8 nm.

As shown by Examples 1–12 and Comparative Example 1–5, the colorant dispersing liquids and the ink compositions made from the colorant dispersing liquids of this invention both have small mean grain sizes and high stability in mean colorant grain size. Therefore, the reliability of the ink for ink jet of this invention is high and there is no need to worry about a jam of the ink jet head.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A pigment dispersing liquid, comprising water;

a pigment;

a dispersing agent, wherein the dispersing agent is at least one member selected from the group consisting of a compound having a general formula (1a) and a compound having a general formula (1b):

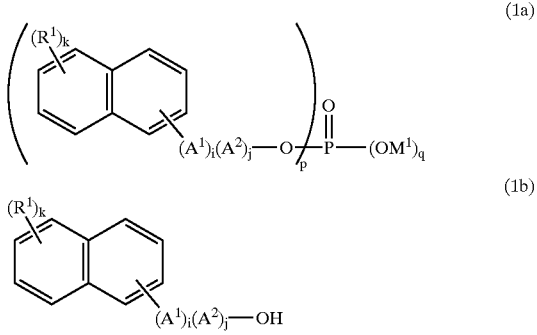

wherein $R^1$ is a hydrogen atom, an alkyl group having from 1 to 20 carbon atoms, an allyl group, an aralkyl group, a phenyl group, a substituted phenyl group or a naphthyl group;

k is an integer of ranging from 0 to 7;

$A^1$ is oxyethylene, oxypropylene or a combination of oxyethylene and oxypropylene;

$A^2$ is oxyethylene, oxypropylene or a combination of oxyethylene and oxypropylene;

$i,j \geq 0$ so that $(i+j)$ ranges from 30 to 100;

$M^1$ is selected from the group consisting of H, Li, Na, K, and $N^+R^2 R^3 R^4 R^5$, wherein each of $R^2, R^3, R^4$ and $R^5$ is H, methyl, ethyl, 2-hydroxyethyl or 3-hydroxypropyl; and $p, q \geq 1$ so that $(p+q)=3$;

wherein if the compound of general formula (1b) is present, $A^1$ and $A^2$ cannot be simultaneously oxyethylene.

2. The pigment dispersing liquid according to claim 1, further comprising at least one compound selected from the group consisting of a compound having formula (2), a compound having formula (3), and a compound having formula (4),

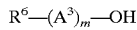

$$R^6-(A^3)_m-OH \qquad (2)$$

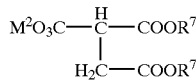

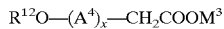

wherein

- in formula (2), $R^6$ is an alkyl group having from 8 to 14 carbon atoms, $A^3$ is oxyethylene, oxypropylene or a combination of oxyethylene and oxypropylene, and m is an integer of ranging from 3 to 16,
- in formula (3), $M^2$ is selected from the group consisting of H, Li, Na, K and $N^+R^8 R^9 R^{10} R^{11}$, wherein each of $R^8$, $R^9$, $R^{10}$, and $R^{11}$ is H, methyl, ethyl, 2-hydroxyethyl or 3-hydroxypropyl, and $R^7$ is an alkyl group having from 1 to 20 carbon atoms, and
- in formula (4), $R^{12}$ is an alkyl group having from 1 to 20 carbon atoms, $A^4$ is oxyethylene, oxypropylene or a combination of oxyethylene and oxypropylene, x is an integer of ranging from 1 to 12, and $M^3$ is selected from the group consisting of H, Li, Na, K and $N^+R^{13} R^{14} R^{15} R^{16}$ wherein each of $R^{13}$, $R^{14}$, $R^{15}$, and $R^{16}$ is H, methyl, ethyl, 2-hydroxyethyl or 3-hydroxypropyl.

3. The pigment dispersing liquid of claim 2, wherein a weight ratio of the dispersing agent to the compound of formula (2) ranges from 99.99/0.01 to 60/40.

4. The pigment dispersing liquid of claim 2, wherein a weight ratio of the dispersing agent to the compound of formula (3) ranges from 99.99/0.01 to 60/40.

5. The pigment dispersing liquid of claim 2, wherein a weight ratio of the dispersing agent to the compound of formula (4) ranges from 99.99/0.01 to 60/40.

6. The pigment dispersing liquid of claim 1, wherein the pigment comprises at least one of member selected from the group consisting of Pigment Yellow 138 and Pigment Red 122.

7. The pigment dispersing liquid of claim 1, wherein the pigment comprises a at least one member selected from the group consisting of Pigment Blue 15, Pigment Blue 15:1, Pigment Blue 15:2, Pigment Blue 15:3 and Pigment Blue 15:4.

8. The pigment dispersing liquid of claim 1, wherein a ratio of the dispersing agent to the pigment ranges from 1/15 to 1.

9. The pigment dispersing liquid of claim 1, wherein a mean grain size of the pigment ranges from 20 nm to 200 nm.

10. The pigment dispersing liquid of claim 1, wherein a concentration of the pigment ranges from 5 wt % to 30 wt %.

11. An ink composition, comprising the pigment dispersing liquid of claim 1 and at least one additive selected from the group consisting of water, a water-soluble solvent, a surfactant and a preservative.

12. The ink composition of claim 11, wherein a mean grain size of the pigment ranges from 20 nm to 200 nm.

13. The ink composition of claim 11, wherein a concentration of the pigment ranges from 1 wt % to 8 wt %.

14. A method for forming an image, comprising
   printing the image with the ink composition of claim 11 and at least one member selected from the group consisting of a piezo ink jet printer and a thermal ink jet printer.

15. A method of making an ink composition, comprising
   mixing the pigment dispersing liquid of claim 1 with at least one additive selected from the group consisting of water, a water-soluble solvent, a surfactant and a preservative.

16. A method of making the pigment dispersing liquid of claim 2,
   comprising mixing the dispersing agent with the pigment, water, and at least one compound selected from the group consisting of a compound having formula (2), a compound having formula (3), and a compound having formula (4).

17. A method of making an ink composition, comprising
   mixing the pigment dispersing liquid of claim 1 with at least one additive selected from the group consisting of water, a water-soluble solvent, a surfactant and a preservative.

* * * * *